July 22, 1952  J. A. KELLETT  2,603,900
FISHING SIGNAL
Filed Jan. 23, 1950
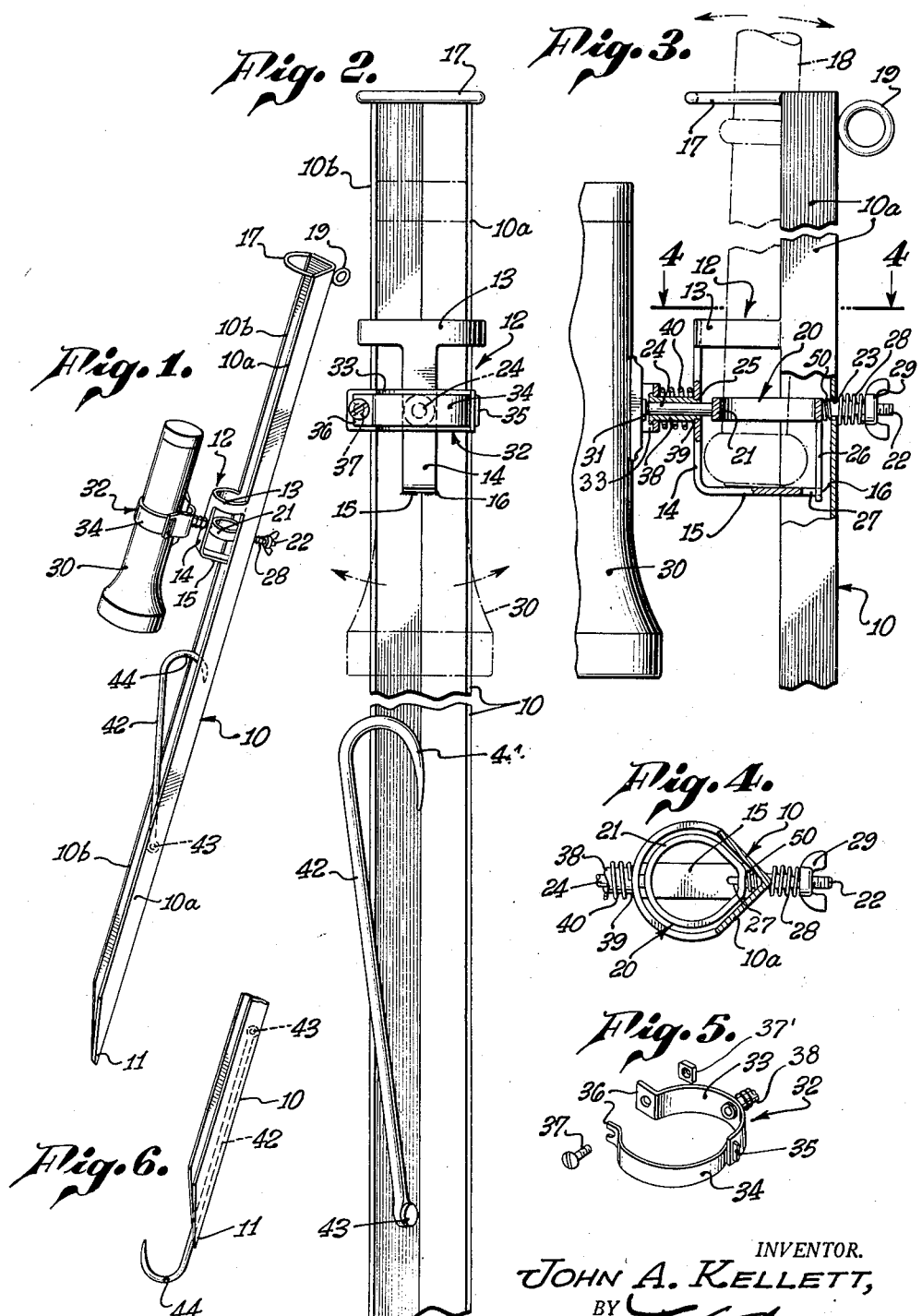
INVENTOR.
JOHN A. KELLETT,
BY
ATTORNEY.

UNITED STATES PATENT OFFICE 2,603,900

FISHING SIGNAL

John A. Kellett, North Hollywood, Calif.

Application January 23, 1950, Serial No. 139,987

3 Claims. (Cl. 43—17)

This invention has to do generally with signaling holders for fish poles adapted to give a signal upon the creation of tension in the fish line and resultant deflection of the pole. More specifically, the invention relates to a novel spike form of pole holder adapted to be driven in beach sand for surf or river fishing and carrying the pole-actuated signaling means.

Generally speaking the invention contemplates the provision of a pole support or standard which mounts a carrier receiving the handle end of the pole and permitting movement thereof in response to a line pull on the pole. Associated with the carrier and preferably in surrounding relation to the pole is a movable signal-actuation element displaceable in response to movement of the pole in the carrier. By resisting such displacement of the signal actuating element by an adjustable spring, it is made possible to variably predetermine the line pull required for actuation of the signal.

While the invention broadly contemplates the use of any appropriate signaling means capable of actuation by the movable element, I preferably employ a flash light signal, since the necessity for a signaling means is largely confined to night fishing when the condition of the pole may not be visible at a distance where the fisherman may prefer to remain instead of staying constantly at the pole. Accordingly, in adapting the assembly for illumination of the flash light, the latter is mounted in such association with the carrier and actuating element that the latter is caused to close the flash light switch in response to a predetermined pull on the pole line.

The invention has various additional features such as the particularities of a preferred angle iron form of sand spike, the relative moveability of the signal actuation element and flash light holder and the accommodation within the under side of the spike of a hook movable to serve the dual purpose of a foot piece in thrusting the spike into the sand, and of a fish gaff when the spike is removed.

All aspects of the invention will be clearly understood from the following detailed description of an illustrative embodiment shown by the accompanying drawing in which:

Fig. 1 is a general view showing the spike and flashlight assembly in side elevation;

Fig. 2 is a fragmentary enlarged scale elevation as viewed from the left of Fig. 1;

Fig. 3 is a side view, partially in section, of the upper portion of Fig. 2;

Fig. 4 is a cross section on line 4—4 of Fig. 3;

Fig. 5 is a perspective showing the parts of the flashlight holder clamp; and

Fig. 6 is a fragmentary view showing the bottom of the spike with the gaff hook in extended position.

In its preferred form, the pole standard or support is made of angle iron 10 having angular flange portions 10a and 10b and a bottom pointed end 11. Formed in effect integrally with the body of the spike is a pole mounting or carrier generally indicated at 12, the carrier being of essentially a socket formation comprising a loop piece 13 terminally secured to flanges 10a and 10b, and a supporting strap 14 extending downwardly from the loop and then inwardly at 15 into the open side of the spike for welded attachment thereto at 16. At its upper end, the spike carries a guide loop 17 in vertical alinement with the carrier 12 so that the handle end 18 of a fish pole, see Fig. 3, may be set down through the loop 17 into seated position within the carrier upon its strap piece 14. Eyelet 19 attached to the upper end of the spike may be used for hanging or suspending the device when not in use.

The carrier portion 12 of the assembly contains a loop signal actuating element generally indicated at 20 and comprising an intermediate portion 21 positioned to extend about the handle end 18 of the pole, a threaded stud portion 22 extending outwardly through an opening 23 in the spike angle iron, and a contactor pin 24 guided within and projecting through an opening 25 in the strap 14. Turning of the element 20 is prevented by a finger 26 depending therefrom within guide slot 27 formed in the inwardly directed portion 15 of the strap 14. Movement toward the left (as viewed in Fig. 3) of the contact element is resisted by coil spring 28 placed about the stud 22 and confined between the spike body and a wing nut 29, the latter being adjustable to vary the compression of the spring, and therefore the resistance of the signal actuating element 20 to displacement by the pole.

While it is contemplated, as previously indicated, that the element 20 may be employed to actuate any desired signaling device, I preferably employ a flashlight 30 mounted on the pole carrier structure 12 in such a relation that the flashlight switch button 31 is actuable by the pin 24. For this purpose the flashlight is held within a ring clamp 32 (see Fig. 5) comprising sections 33 and 34 having a pin and slot interlock at 35, with the opposite ends 36 held together to tighten the clamp about the flashlight body, by bolt 37 cooperating with nut 37'. Referring to Fig. 3, clamp section 33 carries a sleeve 38 received within and secured to the strap 14 at 39. The clamp is movable on the sleeve 38 and movement of the flashlight and clamp assembly toward the spike is resisted by coil spring 40. By virtue of such movement it is possible manually to press the flashlight button 31 against the pin 24 to ascertain the workability of the flashlight independently of its actuation by the pole.

Below the carrier 12, the spike 10 carries within its open face or side a hook 42 hinged at 43 and having in the position of Fig. 2, its upper end received within the angle body of the spike. In this position the hook end 44 may serve the purpose of a foot piece to facilitate thrusting the spike into the sand. As shown in Fig. 6, the hook may be swung down below the bottom of the spike so that the hook becomes available for use as a gaff.

In considering the operation of the device, assume the spike to be thrust in the sand and the pole 18 to be received within the carrier 12 as shown in Fig. 3. In the absence of any pull on the upper portion of the pole, as by way of the fish line, to the right and beyond a predetermined amount which spring 28 is said to resist, the switch actuating element 20 will be maintained from actuating contact with the flashlight switch. Upon exertion of a predetermined pull on the pole, as when a fish is caught on the line, the pole rocks about its point of engagement with the spike at its upper end and thrusts the bottom of the handle toward the left against the loop 21, projecting pin 24 against the switch button 31 to illuminate the flashlight. A swivel engagement or mounting on the sleeve 38 permits full 360 degree rotation of the holder 32 and the flashlight to any position.

It may be desirable to provide for constant illumination of the flashlight independently of the pole, as when the device is to be used, say temporarily, for lighting purposes. In that event, I may place about the stud 22 and between the spike 10 and loop 21 a coil spring 50 which will upon loosening of nut 29 and consequent relief of compression of spring 28, thrust the pin 24 into sustained light illuminating engagement with the switch button 31.

I claim:

1. The combination comprising a sand spike, a carrier on one side of said spike and adapted to receive the handle end of a fish pole, a movable signal actuating element positioned within said carrier to surround the pole and having a projection extending laterally beyond one side of the carrier, said element being displaceable in the direction of said projection in response to lateral movement of the pole within the carrier, a spring resisting such displacement of the element, and a flash light holder secured to the carrier and adapted to hold the switch button of an ordinary flash light in position adjacent said projection.

2. The combination comprising a sand spike, a carrier on one side of said spike, said carrier being adapted to receive the handle end of a fish pole, a movable signal actuating element positioned within said carrier to surround the pole and having a projection extending laterally beyond one side of the carrier, a threaded stem extending from the opposite side of said element through an aperture in said spike, a nut detachably secured to the end of said stem, a coil spring mounted on said stem intermediate the spike and the nut in such a manner as to resist movement of the element, said element being displaceable against the spring resistance in response to lateral movement of the pole within the carrier, and a holder secured to said carrier and adapted to hold a flash light in position for operation of its switch by said projection.

3. The combination comprising a sand spike, a carrier on one side of said spike said carrier being adapted to receive the handle end of a fish pole, a movable signal actuating element positioned within said carrier to surround the pole and having a projection extending laterally beyond one side of the carrier, a threaded stem extending from the opposite side of said element through an aperture in said spike, a nut detachably secured to the end of said stem, a coil spring mounted on said stem intermediate the spike and the nut in such a manner as to resist movement of the element, said element being displaceable against the spring resistance in response to lateral movement of the pole within the carrier, a holder band movably attached to said carrier, said holder band being adapted to hold a flash light in position with its switch positioned for operation by said projection and a spring resisting movement of said holder band relative to the carrier.

JOHN A. KELLETT.

REFERENCES CITED

The following references are of record in the file of this patent:

UNITED STATES PATENTS

| Number | Name | Date |
|---|---|---|
| 1,330,314 | Gott et al. | Feb. 10, 1920 |
| 1,654,876 | Hemming | Jan. 3, 1928 |
| 2,204,692 | Parisio | June 18, 1940 |
| 2,238,127 | Nissen | Apr. 15, 1941 |
| 2,481,881 | Schneider | Sept. 13, 1949 |
| 2,538,788 | Massino | Jan. 23, 1951 |